Jan. 5, 1943.  G. H. HUFFERD  2,307,132
FASTENER DEVICE
Filed Sept. 27, 1941  3 Sheets-Sheet 1
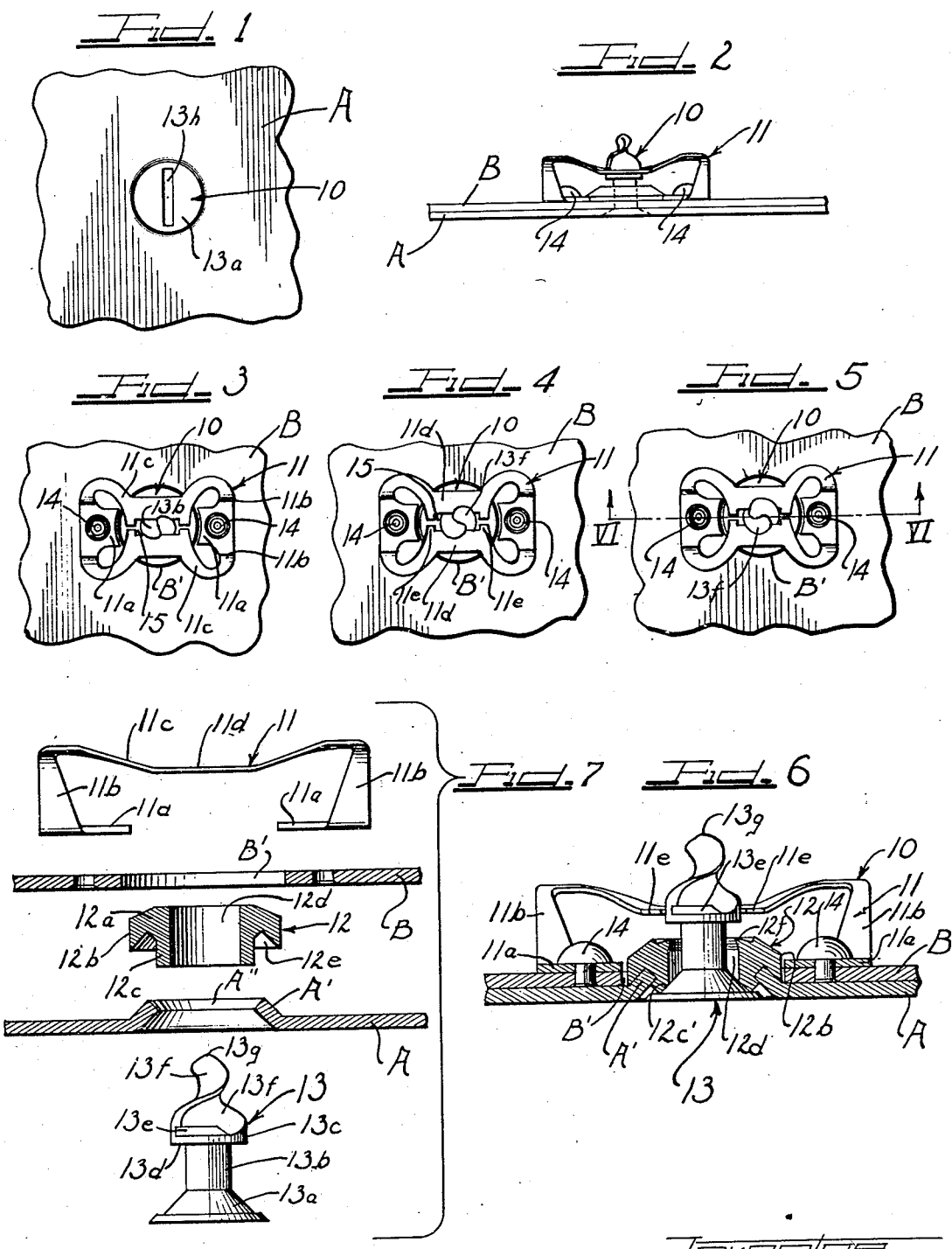
Inventor
GEORGE H. HUFFERD

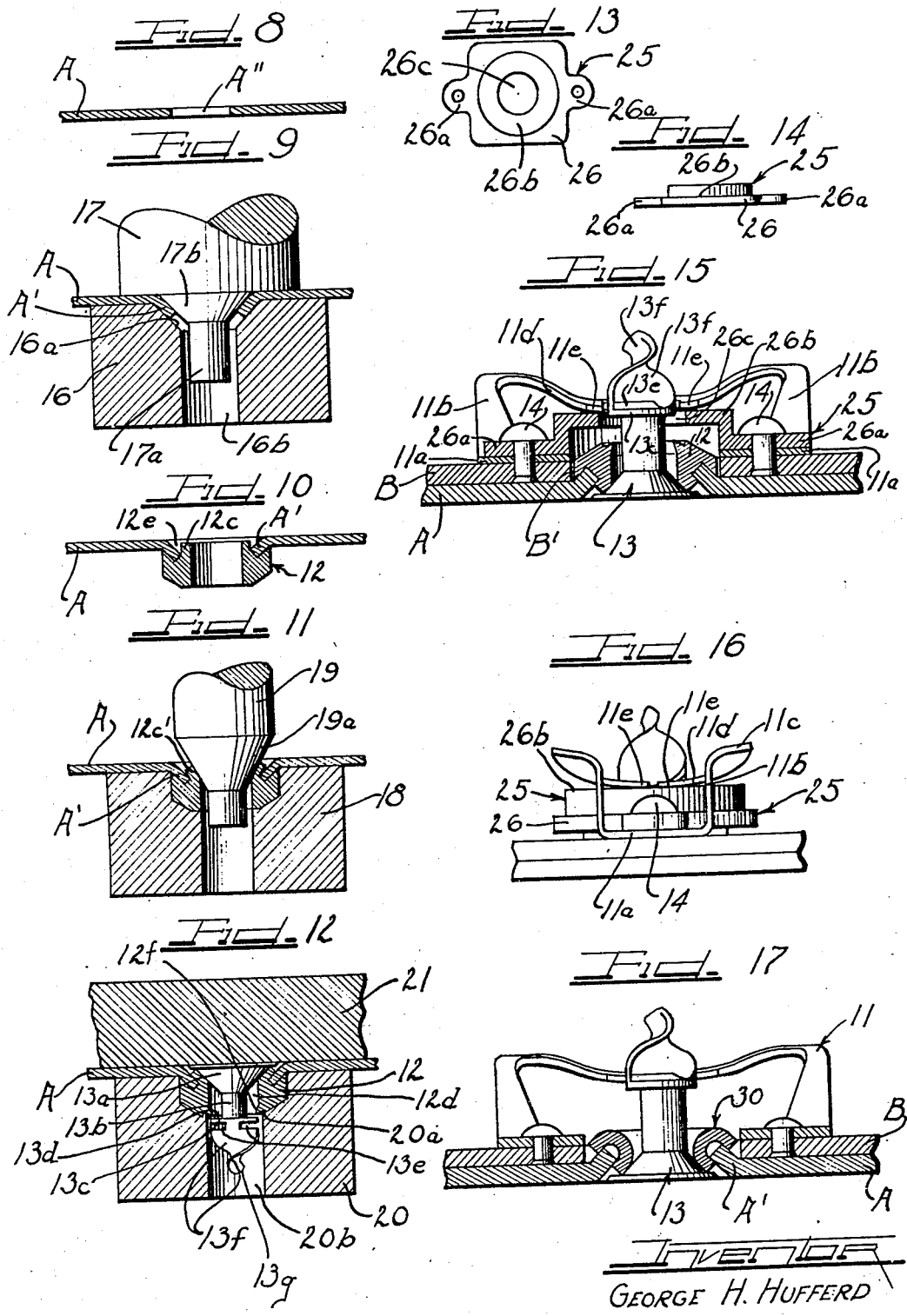

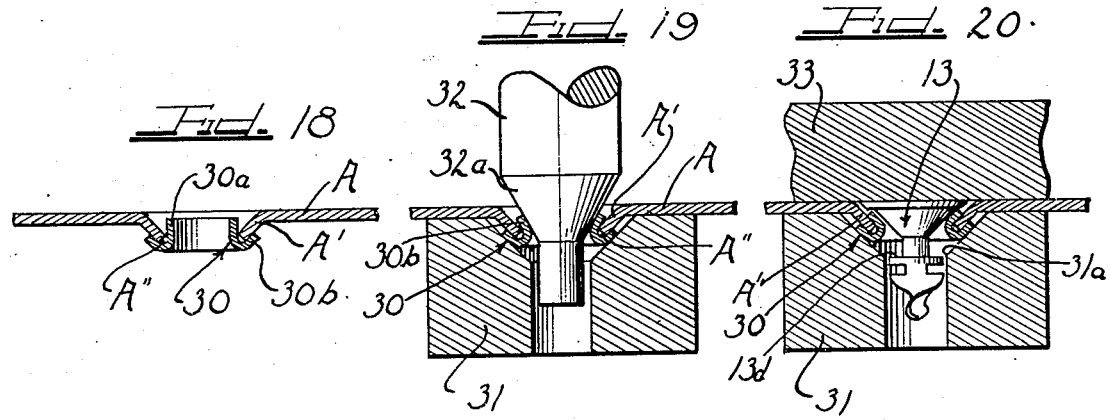
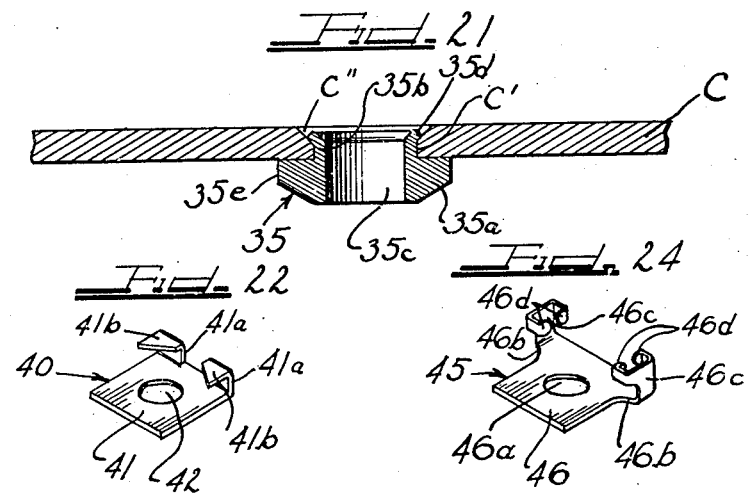
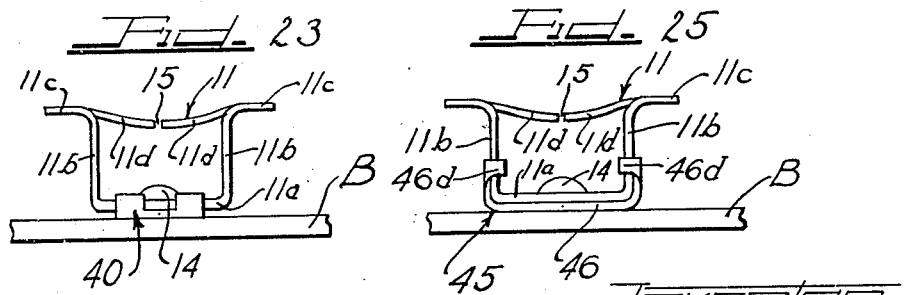

Patented Jan. 5, 1943

2,307,132

UNITED STATES PATENT OFFICE 2,307,132

FASTENER DEVICE

George H. Hufferd, Grosse Pointe, Mich., assignor to Thompson Products Incorporated, Cleveland, Ohio, a corporation of Ohio Application September 27, 1941, Serial No. 412,642

18 Claims. (Cl. 24—221)

This invention relates to fastening devices for detachably securing together a plurality of parts or portions of the same part. The devices are especially useful in fastening airplane cowling, airplane inspection plates, automotive accessories and the like.

More specifically this invention relates to fastening devices which are manipulated into and out of locked and released positions with a positive "snap" action.

A feature of the invention includes the provision of a locking stud which acts on a spring device in a plurality of planes to move the spring device laterally and axially of the stud.

Another important feature of the invention deals with the lateral or outward stressing of a spring member as it is being moved to locked position followed by a release of the lateral position stresses in the spring member when it reaches locked position so that the spring member will "snap" into locked position.

The fasteners of this invention thus lock and unlock with a positive "snap" action.

A further feature of the invention resides in the provision of grommets for carrying shear loads independently of spring efforts.

Another feature of the invention resides in the provision of a bridge member to increase the tension load capacity of the fastening device which member is capable of coacting with the spring of the device under heavy loads for increasing the spring resistance.

An object of the invention therefore is to provide fastening devices which are snapped into locked position and snapped into release position by reverse rotation of a single member.

A further object of this invention is to provide fasteners which are snapped into locked position by a quarter turn of a stud and which are snapped out of locked position into released position by reverse quarter turn rotation of the same stud.

A further object of the invention is to provide a spring fastener having a separate shear load carrying member operating independently of the spring.

A still further object of this invention is to provide devices for detachably securing one part on another part without effecting any wear on the parts.

A further object of this invention is to provide fastening devices having separate shear and tension load carrying members.

A still further object of this invention is to provide a spring type fastener which automatically increases the rate of spring resistance upon application of increased tension load.

Other and further objects of this invention will become apparent to those skilled in the art from the following detailed description of the annexed sheets of drawings which, by way of example, illustrate several preferred embodiments of the invention.

On the drawings:

Figure 1 is a top plan view of a fastener according to this invention mounted in a sheet of metal.

Figure 2 is a side elevational view of a fastener according to this invention illustrating the same in locked position and holding together a pair of metal sheets.

Figure 3 is a bottom plan view of the fastener illustrated in Figures 1 and 2 and showing the position of the spring member at the start of the fastening operation.

Figure 4 is a view similar to Figure 3 and illustrating the position of the spring member and stud as the stud is partially rotated to locked position.

Figure 5 is a view similar to Figures 3 and 4 but illustrating the positions of the spring member and stud in locked relation.

Figure 6 is an enlarged, vertical cross-sectional view, with parts in elevation, taken along the line VI—VI of Figure 5.

Figure 7 is an exploded view with parts in elevation and with other parts in vertical cross-section illustrating the several metal sheets and fastener elements disclosed in Figures 1 to 6.

Figures 8 to 12 are vertical cross-sectional views, with parts in elevation, illustrating the manner in which the shear load carrying grommet of the fastener is secured in a metal plane and also illustrating the manner in which the locking stud of the fastener is rotatably retained in the grommet.

Figure 13 is a plan view of a bridge member adapted for use in the fastening devices of this invention to increase the tension load carrying capacity of the devices.

Figure 14 is a side elevational view of the bridge member shown in Figure 13.

Figure 15 is an enlarged vertical cross-sectional view, with parts in elevation, illustrating a fastener according to this invention equipped with a bridge member such as is shown in Figures 13 and 14.

Figure 16 is an end elevational view of the fastener assembly shown in Figure 15.

Figure 17 is an enlarged vertical cross-sectional view, with parts in elevation, of a modified form of fastening device according to this invention illustrating the same mounted in position to lock together a pair of metal sheets.

Figures 18 to 20 are cross-sectional views, with parts in elevation, illustrating the manner in which the grommet for the fastener shown in Figure 17 is mounted in a metal sheet and also illustrating the manner in which the locking stud of the fastener is rotatably retained in the grommet.

Figure 21 is an enlarged vertical cross-sectional view illustrating another modified form of grommet for use in fastener devices according to this invention showing the same mounted in a relatively thick plate.

Figure 22 is an isometric view of a shim for use with the fastener devices of this invention to vary the range of use of a particular fastener.

Figure 23 is an end elevational view illustrating the manner in which the shim of Figure 22 is mounted on the spring of the fastener.

Figure 24 is an isometric view of a modified form of shim.

Figure 25 is an end elevational view illustrating the manner in which the modified shim shown in Figure 24 is mounted on the spring of the fastener.

On the drawings:

In Figures 1 to 6, inclusive, the reference characters A and B designate parts, such as metal sheets, to be fastened together by the fastener 10 of this invention. As best shown in Figure 7 the fastener is composed of a spring member 11, grommet 12, and a locking stud 13. The plate B is apertured as at B' to receive the grommet 12 freely therethrough while the plate A is embossed as at A' and punched as at A'' to provide a dimpled aperture therethrough adapted to fixedly retain the grommet 12.

As best shown in Figure 6 the spring member 11 is riveted to the plate B by means of rivets 14.

The spring member 11 is a one-piece member having a pair of feet 11a, 11a, on opposite sides of the aperture B' through the plate B. These feet receive the rivets 14. Each foot 11a has a pair of upstanding legs 11b thereon supporting bridging arms 11c in spaced relation above the feet 11a. The bridging arms 11c extend between the legs 11b on each side of the feet 11a and bridge the aperture B' in the metal plate B.

Each arm 11c has a central inwardly disposed portion 11d over the aperture B'. These inwardly disposed portions 11d define therebetween a slot 15 adapted to receive a portion of the stud 13 as will hereinafter be described. The ends of each inwardly disposed portion 11d have inwardly projecting ears 11e defining the ends of the slot 15. These ears 11e are maintained in spaced opposed relation as shown in Figures 3 to 5 during the loading and unloading of the spring by the stud as shown in Figures 3 to 5 and serve a particular function as will hereinafter be described.

The spring member 11 may be stamped from a flat piece of metal. The arms 11c curve outwardly and inwardly from the portions 11d thereof to merge with the upper ends of the legs 11b which are substantially aligned with the outer edges of the inwardly projecting central portions 11d. This outward and inward curvature of the arms gives increased spring action as will be more fully hereinafter described. When viewed endwise as shown in Figures 16, 23 and 25, the legs 11b of the spring member 11 may be considered as having outwardly extending flanges 11c with inwardly extending central portions 11d defining the slot 15 and with these central portions 11d of the flanges 11c somewhat curved downwardly from the flanges.

The grommet 12 has a head 12a defining a vertical cylindrical shoulder 12b adapted to fit into the aperture B' of the plate B. A cylindrical shank 12c extends from the head 12a and is adapted to fit in the aperture A'' of the plate A. The grommet 12 has a cylindrical axial bore 12d therethrough sized to receive the shank portion and operating end of the locking stud 13.

The head 12a of the grommet 12 is annularly recessed as at 12e to receive the embossed portion A' of the plate A therein.

As shown in Figures 8 to 11 the plate A with the aperture A'' therein is placed over a die 16 (Figure 9) having a conical seat 16a and a cylindrical bore 16b adapted to receive the leading cylindrical end 17a of a punch 17. The punch 17 has a conical portion 17b for forcing the portion of the plate around the aperture A'' against the seat 16a of the die to form the dimple A'. The shank 12c of the grommet 12 is then inserted through the aperture A'' of the plate as shown in Figure 10 until the dimple A' is seated in the recess 12e of the grommet head. As shown in Figure 11 the assembly of Figure 10 is seated on a die 18 and the grommet shank is acted on by the conical surface 19a of a punch 19 to press the shank 12c of the grommet 12 outwardly into gripping engagement with the dimple A' of the plate A as at 12c'. The plate A, as best shown in Figure 6, thus has the grommet 12 fixed thereon at the inner end of the dimple and this grommet lines the aperture through the plate and at the same time provides, with the head 12a thereof, a shear load carrying surface 12b for abutment with the plate B.

The locking stud 13, as shown in Figure 7, comprises a conical head 13a adapted to fit into the dimple A' of the plate A and engage the spread shank 12c' of the grommet, as shown in Figure 6. A cylindrical shank 13b extends from the small end of the head 13a and is adapted to fit freely in the bore 12d of the grommet 12 as also shown in Figure 6.

The shank 13b has an enlarged cylindrical end portion 13c defining a shoulder 13d. The cylindrical end portion 13c has transverse slots 13e (Figures 7 and 12) on diametrically opposed sides thereof. These slots are open ended and are disposed normally to the axis of the stud shank.

A pair of helical grooves 13f are cut in the enlarged end 13c of the stud shank. Each groove 13f extends from an end of a separate slot 13e for one-quarter turn around the end portion 13c to terminate in a common point 13g at the end of the stud shank. The grooves 13f, 13f provide separate diverging cam surfaces from the point 13g to a separate slot 13e. The helically grooved stud portion 13c may be considered as having double tapered threads starting from a common point axially of the stud shank and diverging along helical paths outwardly toward the periphery of the shank portion 13c to the undercut slots 13e therein.

As shown in Figure 12 the grommet and plate assembly is seated in another die 20 having a seat accommodating the grommet but provided with a bead 20a to flow metal from the grommet head into the bore 12d of the grommet.

The stud 13 is then dropped into the grommet 12 so that the shoulder 13d projects beyond the grommet head in the passageway 20b of the die. A press 21 then squeezes the plate and grommet assembly to force the grommet head into the bead 20a of the die and flow metal from the head to form a reduced end 12f for the grommet bore 12d. This reduced end 12f will abut the shoulder 13d of the stud to rotatably retain the stud in the grommet.

From the above descriptions it will be understood that the fastener is composed of a locking stud rotatably mounted in a grommet which is fixedly secured to one part to be fastened to a second part. This locking stud has opposed cam surfaces diverging from the end of the stud along helical paths into undercut slots. The other part of the fastener is a one-piece spring member fixedly secured to the second part to be fastened and having bridging spring arms defining therebetween a slot adapted to receive the cam end of the locking stud.

As best illustrated in Figures 3 to 6 the plates A and B with the fastener elements thereon are placed together so that the grommet 12 extends through the aperture B' and so that the stud has the cam end thereof extending into the slot 15 of the spring 11 carried by the plate B. The pointed end 13g of the stud is adapted to freely fit into the slot 15 of the spring. The stud is then rotated by inserting a screw driver or other tool in the slot 13h (Figure 1) of the stud head 13a so as to cause the opposed helical threads formed by the grooves 13f, 13f to engage the central portion 11d, 11d of the spring member as shown in Figure 4. This rotation effects a simultaneous lateral spreading and axial drawing down of the spring arms relative to the stud. In other words the spring arms are forced apart while they are being drawn toward the stud head. This forcing apart of the spring arms continues until the arms reach the slots 13e, 13e of the stud whereupon the arms will snap into the slots with a positive clicking action and will resume their normal lateral spatial relation. However, the arms are held in their drawn down positions by the stud. As a result of a quarter turn of the stud, therefore, the fastener parts are locked together with a snap action. A reverse turn of the stud will unlock the spring arm portions 11d, 11d out of the slots 13e, 13e of the stud with a positive clicking action causing the spreading apart of the arms. Upon completion of the quarter turn rotation of the stud the parts are completely disengaged. The tendency of the springs to reclaim the initial width of the slot 15 after the spring has been snapped out of the stud slot 13e, 13e aids the reverse rotation of the stud to completely disengaged position thus only necessitating manual effort to initiate rotation of the stud until the "click" is audible. The parts are then disconnected.

As best shown in Figure 6, the grommet 12 receives the stud 13 and insulates the stud against contact with either of the plates A or B. The grommet wall 12b provides a shoulder which is fixedly secured to the plate A for abutment with the wall defining the aperture B' of the plate B. This grommet thus carries shear loads between the plates A and B and, since it is at right angles to both plates, the shear load will not be carried by the spring member 11. In addition, the right angular relationship between the wall of the grommet carrying the shear load and the plates prevents any tendency for the plates to separate due to such load. The spring 11 carries the tension load while the grommet 12 carries the shear load.

Since the stud 13 and grommet 12 are preferably formed of steel while, especially in aircraft installations, the plates A and B may be formed of another metal such as aluminum or other lightweight alloy, it is desirable to have the steel parts plated with some non-corrosive material such as cadmium so that corrosive action will not occur between the aluminum and the steel parts. Obviously, however, such a plating on the steel parts, if subjected to wear such as occurs due to relative rotation between the stud and grommet, would be damaged and it is thus highly desirable that the stud does not contact the aluminum. All steel parts of the fastener which contact the aluminum are immovably fixed on the aluminum and relatively movable and engaging parts of the fastener are made of the same metal which will not corrode due to bearing contact between the surfaces thereof. The grommet thus serves the dual purpose of providing a shear load carrying member and of insulating the stud from the parts to be fastened together.

In the event it is desired to increase the tension load carrying capacity of the fastener a bridge member 25 such as is shown in Figures 13 to 16 can be used. This bridge member 25 comprises a square or rectangular metal plate 26 adapted to fit under the spring arms 11c and between the spring legs 11d. The plate has laterally projecting apertured ears 26a, 26a adapted to be disposed over the feet 11a, 11a of the spring and receive the spring-securing rivets 14, 14 through the apertures thereof. These ears fit rather freely between the legs 11b of the spring but the corners of the plate 26 prevent unauthorized removal of the bridge member from the spring so that the spring and bridge can be shipped as a sub-assembly without requiring additional securing means to hold the same together.

The plate 26 has a central circularly embossed or raised portion 26b adapted to cover the opening B' of the plate B. This embossed portion, however, is centrally apertured as at 26c to receive the shank end 13c of the stud 13 therethrough.

As shown in Figures 15 and 16 when the cam surfaces on the stud end 13e draw the central portions 11d of the arms 11c downwardly toward the stud head they move the ears 11e into substantially contacting engagement with the embossed portion 26b of the bridge member 25. When the fastener is locked and tension loads are applied tending to separate the plates A and B these ears 11e will firmly engage the bridge member to further stiffen the spring 11 and change the rate of spring resistance. After the ears have contacted the bridge further deflection of the spring member can only occur through a twisting of the spring arms 11c. This twisting, of course, requires materially more force than mere deflection of the arms such as occurs before the ears contact the bridge member.

The assembly shown in Figures 15 and 16 is thus highly desirable when the fastener is to be subject to high tension loads as well as to high shear loads since the grommet 12 will carry great shear loads. The bridge member can be used with the same spring, grommet and stud assembly illustrated in Figures 1 to 7.

In the event that the fasteners of this invention are not to be subjected to high tension or shear loads a somewhat cheaper assembly such as is shown in Figure 17 can be provided. As therein shown, a stamped grommet 30 can be used to engage the dimple A' of the sheet A in place of the more expensive machined grommet 12. This grommet is readily assembled on the dimple of the plate A as shown in Figures 18 to 20. As shown in Figure 18, for example, the grommet 30 initially has a hollow cylindrical shank 30a stamped to fit through the aperture A" in the plate A. The grommet also initially has an outwardly flared flange 30b on the end of the shank 30a adapted to seat under the dimple A'.

As shown in Figure 19 the plate A and grommet assembly 30 of Figure 18 is placed on a die 31 and the shank 30a is pressed by means of the conical surface 32a of a punch 32 into gripping engagement with the dimple A'. This pressing operation forms the cylindrical shank 30a into a flange 30b tightly gripping the dimple A'. The resulting structure thus assumes the shape of an eyelet lining the aperture A" of the dimple A'.

The stud 13 is next rotatably retained in the eyelet-type grommet 30 by inserting the same through the eyelet and by squeezing the assembly between the die 31 and a flat press 33. The conical seat 31a of the die 31 forces the grommet upwardly to slightly bend the dimple wall A' and thereby decrease the effective diameter sufficiently to cause the grommet to abut the shoulder 13d of the stud so that the shoulder will not pass through the grommet.

The assembly of Figure 17 operates in the same manner as described in connection with the assembly shown in Figures 1 to 7. The cheaper stamped eyelet-type grommet 30 insulates the stud 13 from the plates A and B but, since it does not have right-angular relationship with the plate B, and does not have the strength of the grommet 12, it will not carry the high shear load capable of being carried by the grommet 12.

In the event that the parts to carry the grommet of the fasteners of this invention are quite thick the arrangement shown in Figure 21 may be used wherein the reference character C represents a thick metal plate. This plate has a cylindrical aperture C" which is counterbored as at C'" at one end thereof. A grommet 35 having a cylindrical head portion 35a and a reduced diameter shank portion 35b together with a cylindrical bore 35c through the head and shank has the shank 35b inserted into the aperture C" of the plate C. The counterbore C'" is gauged so that at least a portion of the shank 35b will extend therein and this extending portion is then peened, spun or pressed as at 35d into engagement with the wall defining the counterbore C'".

The assembly thus has a grommet head on one side of the thick plate defining a shear load carrying shoulder 35e in right angular relation to the plate. The shank of the grommet lines the aperture in the plate and is adapted to receive the fastener stud 13 as described above. This type of grommet can be fitted into a plate of any thickness since the counterbore C'" can be made of a depth sufficient to receive the shank 35b with a portion thereof extending into the counterbore. In many instances it may not be possible to dimple the grommet-receiving plate because of the thickness of the plate and the assembly shown in Figure 21 is therefore used.

In Figures 22 and 23 there is illustrated a shim 40 a pair of which are adapted to be mounted under the feet 11a of the spring 11 so as to vary the spatial relation of the spring arms 11d from the plate B. The shim 40 comprises a flat square or rectangular metal sheet 41 having a central aperture 42 therethrough adapted to receive the retaining rivet 14. One end of the sheet 41 has a pair of upstanding legs 41a with ears 41b at the upper ends thereof bent back over the plate 41 in spaced parallel relation therefrom. These ears 41b are adapted to be slipped over a foot 11a of the spring as shown in Figure 23 to carry the plate portion under the foot and thereby raise the spring above the plate B.

Another form of shim is shown in Figures 24 and 25. As therein shown a shim 45 comprising a square or rectangular flat metal sheet 46 with a rivet-receiving aperture 46a therethrough has laterally extending portions 46b on one end thereof carrying legs 46c extending upwardly from the plate 46 but in laterally spaced relation therefrom.

The upper ends of the legs 46c have clamping ears 46d adapted to fit around the legs 11b of the spring member 11 as shown in Figure 25 to carry the flat plate portion 46 under the foot 11a of the spring. This type of shim can be more firmly attached to the spring 11 than the type shown in Figure 22 and the spring and shim can thus better be shipped as a sub-assembly without danger of separation of parts.

The shims, of course, can be made so that plates 41 or 46 are of any desired thickness to raise the spring member 11 away from the plate B any desired distance. The use of such shims makes it possible to materially cut down the number of stud sizes for different installations. Thus the stud 13 may be furnished in sizes varying one-sixteenth of an inch in length while the shims can be furnished in one-thirty-second of an inch in thickness. The use of the shim will thus make possible the use of an overlength stud. It will be appreciated, of course, that the thicknesses of the parts to be fitted together vary appreciably and that the number of parts to be fastened together may vary. For example other parts could be sandwiched between the plates A and B and an entire stack of plates can be fastened together by a single fastener.

The fasteners of this invention are light in weight, operate with positive "snap" action and have independent shear load carrying and tension load carrying means.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A fastening device comprising coengaging fastening elements including spring arms defining a slot therebetween and adapted to be fixed to a part to be fastened to a second part and a headed locking stud adapted to be rotatably mounted in the second part; said locking stud having diverging helical cam surfaces adapted to enter the slot and be rotated to force the arms laterally outward while drawing the same toward the head of the stud, and said stud having grooves receiving the laterally deflected and drawn arms from the cams to relieve lateral deflecting stresses in the arms without appreciable relief of the drawing stresses therein whereby at the completion of the fastening operation the arms will snap into the grooves for retaining the parts together and whereby said stud must be reversibly rotated with sufficient effort to snap the arms apart and out of the grooves to unfasten the parts.

2. A fastener device adapted to detachably connect a plurality of apertured parts which comprises a spring member adapted to be fixedly mounted on the innermost part and having spring arms defining a slot therebetween, a locking stud adapted to extend through the parts into said slot, said locking stud having diverging cam surfaces engaging said arms to spread the same while simultaneously drawing them toward the innermost part, and said stud having oppositely disposed grooves therein normal to the axis thereof each communicating with a divergent end of a cam surface to receive a spring arm therefrom and relieve the spreading stresses therein whereby said stud and said spring arms will be locked together with a snap action.

3. A fastener device comprising a spring member having feet adapted for fixed connection to a part to be fastened to a second part, upstanding legs on each foot of the spring, spring arms connecting the upper ends of pairs of legs to define a slot therebetween in spaced relation from said parts, a locking stud adapted to project through the parts to be fastened together and into said slot between the spring arms, and cam surfaces on said locking stud coacting with said spring arms to spread the same apart while drawing them toward the part on which the spring is mounted, and said stud having arm receiving slots at the ends of said cam surfaces to receive the laterally spread spring arms for relieving the lateral stresses therein.

4. A fastening device for detachably connecting a plurality of apertured parts which comprises a spring member adapted to be mounted on the innermost part and having a plurality of spring arms bridging the aperture thereof in spaced relation therefrom, a grommet fixedly mounted in the aperture of the outermost part and having a shoulder extending into the aperture of another part adapted to thrust against said other part, and a locking stud extending through said grommet and between said spring arms to cooperate therewith for holding the parts together whereby tension loads will be borne by said spring and shear loads will be borne by said grommet.

5. In a fastening device for detachably connecting a plurality of apertured parts the improvements which comprise a spring member carried by the innermost part having spring arms bridging the aperture thereof in spaced relation therefrom, a shear load carrying grommet fixedly secured to the outermost part and projecting into the aperture of an adjacent part to form an abutment shoulder therefor, and a locking stud extending through said grommet having cam surfaces for engaging said spring arms to draw the parts together.

6. A fastener for detachably connecting an apertured part to a second apertured part which comprises a hollow grommet mounted in the aperture of the first part and projecting into the aperture of the second part to provide an abutment shoulder engageable with the aperture, defining wall of the second part, a spring member mounted on the second part, and a locking stud extending through said grommet and both of said parts having locking instrumentalities cooperating with said spring member.

7. A fastening device for detachably connecting one apertured part to a second apertured part which comprises a spring member secured to the second part having spring arms bridging the aperture in spaced relation from the second part, a grommet fixedly mounted in the aperture of the first part and extending into the aperture of the second part to define an abutment shoulder substantially parallel with the aperture defining wall of the second part, a locking stud rotatably retained in said grommet, a double helically grooved enlarged end on said locking stud adapted to project between the spring arms and providing cam surfaces for spreading the arms apart while drawing the same toward the second part, and said end of the stud having slots therein normal to the axis of the stud for receiving the spread spring arms from the ends of the cam surfaces with snap action whereby rotation of the stud will draw the parts together into locked relation.

8. In a fastener adapted to detachably connect a plurality of apertured plates including an outermost plate having an embossed aperture defining portion in sloping relation to the plate, the improvement which comprises a headed grommet having a sloping annular recess in the head thereof adapted to receive said sloping embossed portion of the outermost part and a shank portion adapted to be expanded into engagement with said embossed portion of the outermost part to fixedly secure the grommet in the aperture thereof.

9. A fastener for detachably connecting a plurality of apertured plates comprising a spring member carried by the innermost plate, a hollow grommet carried in the aperture of the outermost plate and projecting into the aperture of an adjacent plate to provide a shear load carrying surface adapted to abut the aperture defining wall of said adjacent plate, and a stud rotatably mounted in said grommet having locking instrumentalities cooperating with said spring whereby said spring and stud carry tension loads and said grommet carries shear loads independently of said spring.

10. In a fastener adapted for connecting a plurality of apertured parts including a spring member carried by the innermost part and a locking stud member rotatably carried by the outermost part, the improvement which comprises a hollow grommet fixedly mounted in the aperture of the outermost part for receiving the locking stud therethrough and having a shoulder at right angles to the parts and projecting from the outermost part into the aperture of an adjacent part for carrying shear loads.

11. A fastener comprising a plurality of deflectable spring arms, a stud having locking instrumentalities adapted to project between the spring arms to deflect the same, and a separate rigid bridge member underlying the spring arms and adapted to abut the arms when the same are deflected for resisting further deflection thereof.

12. A fastener adapted for detachably connecting a plurality of apertured parts which comprises a spring member adapted to be carried by the innermost part having upstanding legs carrying spring arms in spaced relation from said innermost part, a separate apertured bridge member spanning the aperture in said innermost part and thrusting against the innermost part to provide a stiff abutment surface under the spring arms, a locking stud rotatably mounted in the outermost part and projecting through the bridge member into the space between the spring arms and locking instrumentalities on said stud member cooperating with said spring arms to draw the same toward the bridge member, said bridge member adapted to abut said spring arms upon further deflection thereof to stiffen the spring resistance under tension load.

13. In a fastener device for detachably connecting a plurality of parts including a spring member and a locking stud adapted to cooperate therewith the improvement which comprises a bridge member adapted to receive the locking stud freely therethrough and defining a rigid abutment surface under said spring thrusting against one of the parts.

14. A fastener comprising a spring member having a pair of spaced feet adapted to be fixedly secured to a part to be fastened to a second part, upstanding legs on opposite sides of said feet, spring arms connecting the legs on the same sides of both feet, said spring arms having inwardly bowed portions defining a slot therebetween, ear projections on said arms defining the ends of said slot, a bridge member mounted on said feet having a central embossed portion raised above said first part and underlying said spring arms, and a locking stud rotatably mounted in said second part and projecting through said bridge member into the slot between the spring arms, and said locking stud having locking instrumentalities thereon cooperating with said spring arms to draw the same toward the bridge member whereby tension loading of the parts will deflect said ears into abutment with the embossed portion of said bridge to increase the spring resistance of said spring member.

15. In a fastening device for detachably connecting a plurality of apertured parts including a spring member having feet adapted to be connected to an innermost part and having spring arms carried by said feet in spaced relation from said innermost part, the improvement which comprises a shim adapted to be interposed between a foot of said spring and said innermost part, and said shim having attachment tabs overlying said foot of the spring to retain the shim on the foot.

16. In a fastener device including a spring member adapted to be fixedly connected to a part which is to be detachably connected to a second part and said spring having upstanding legs projecting inwardly from said part, the improvement which comprises a shim underlying said spring having fastening means engaging said legs of the spring.

17. In a fastener including a spring member having a pair of feet, upstanding legs on opposite sides of each foot, and spring arms carried by said legs, the improvement which comprises shims underlying said feet of the spring member and having upstanding legs adjacent said legs of the spring member, and ears on said legs of the shims for gripping said legs of the spring member to retain the shims in position under the spring feet.

18. A fastener for detachably connecting a plurality of apertured plates including a relatively thick counterbored outermost plate comprising a spring mounted on the innermost plate, a headed hollow grommet having a shank extending into the aperture of the outermost plate and expanded into the counterbore of the aperture, said head of the grommet adapted to fit into the aperture of the adjacent plate to provide a shear load carrying surface, and a stud rotatably mounted in said grommet having a cam end cooperating with said spring to draw the plates together into locked relation.

GEORGE H. HUFFERD.

DISCLAIMER 2,307,132.—*George H. Hufferd*, Grosse Pointe, Mich. FASTENER DEVICE. Patent dated January 5, 1943. Disclaimer filed October 4, 1943, by the assignee, *Thompson Products, Incorporated.*

Hereby enters this disclaimer to claims 11 and 13 of said patent.

[*Official Gazette November 9, 1943.*]